(12) United States Patent
Nelogal et al.

(10) Patent No.: US 10,146,632 B2
(45) Date of Patent: *Dec. 4, 2018

(54) EFFICIENT MECHANISM TO REPLICATE DATA FOR MULTIPLE CONTROLLERS

(71) Applicant: DELL PRODUCTS, LP, Round Rock, TX (US)

(72) Inventors: Chandrashekar Nelogal, Round Rock, TX (US); James P. Giannoules, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,442

(22) Filed: Feb. 22, 2017

(65) Prior Publication Data

US 2017/0161154 A1  Jun. 8, 2017

Related U.S. Application Data

(63) Continuation of application No. 14/608,821, filed on Jan. 29, 2015, now Pat. No. 9,600,378.

(51) Int. Cl.
*G06F 13/00* (2006.01)
*G06F 11/14* (2006.01)
(Continued)

(52) U.S. Cl.
CPC ...... *G06F 11/1451* (2013.01); *G06F 11/1435* (2013.01); *G06F 11/1469* (2013.01);
(Continued)

(58) Field of Classification Search
None
See application file for complete search history.

(56) References Cited

U.S. PATENT DOCUMENTS 7,457,980 B2   11/2008   Yang et al.
7,542,986 B2    6/2009   Lubbers et al.
(Continued)

OTHER PUBLICATIONS

Rouse , failover definition, 2005.*

*Primary Examiner* — Duc Doan
(74) *Attorney, Agent, or Firm* — Larson Newman, LLP

(57) ABSTRACT

An information handling system and method allows implementation of fault-tolerant storage subsystems using multiple storage controllers not themselves originally designed to support the redundancy of such fault-tolerant storage subsystems. In accordance with one embodiment, uncommitted data is efficiently and rapidly replicated across multiple commodity storage controllers, enabling faster and less expensive fault-tolerant storage subsystems. A redundant storage controller system using non-redundant storage controllers can improve the efficiency of data replication while providing failure protection against controller failure. A redundant storage controller system using non-redundant storage controllers and shared memory commonly accessible to the storage controllers can be enhanced to replicate data within host memory regions to protect against non-volatile memory failure. In accordance with at least one embodiment, an efficient data replication mechanism can be provided between storage controllers using off-the-shelf hardware.

20 Claims, 4 Drawing Sheets

(51) Int. Cl.
 *G06F 11/16* (2006.01)
 *G06F 11/20* (2006.01)
(52) U.S. Cl.
 CPC ...... *G06F 11/1658* (2013.01); *G06F 11/2089* (2013.01); *G06F 2201/84* (2013.01); *G06F 2201/845* (2013.01)

(56) References Cited

U.S. PATENT DOCUMENTS

| | | |
|---|---|---|
| 8,762,642 B2 | 6/2014 | Bates et al. |
| 2008/0005614 A1* | 1/2008 | Lubbers ............ G06F 11/2092 714/11 |
| 2008/0133869 A1 | 6/2008 | Holt |
| 2010/0054254 A1 | 3/2010 | Holt |

* cited by examiner

EFFICIENT MECHANISM TO REPLICATE DATA FOR MULTIPLE CONTROLLERS

CROSS-REFERENCE TO RELATED APPLICATION

This application is a continuation of U.S. patent application Ser. No. 14/608,821, entitled "Efficient Mechanism to Replicate Data for Multiple Controllers," filed on Jan. 29, 2015, the disclosure of which is hereby expressly incorporated by reference in its entirety.

FIELD OF THE DISCLOSURE

The present disclosure generally relates to information handling systems, and more particularly relates to replicating data for multiple controllers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
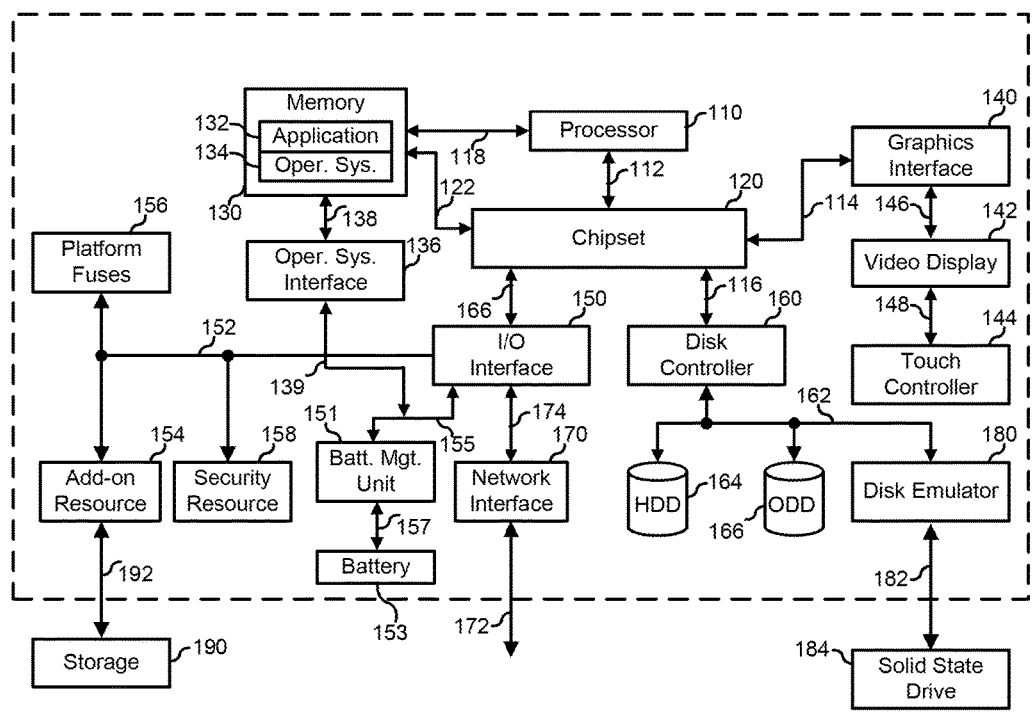
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 120 via a graphics interface 114, and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
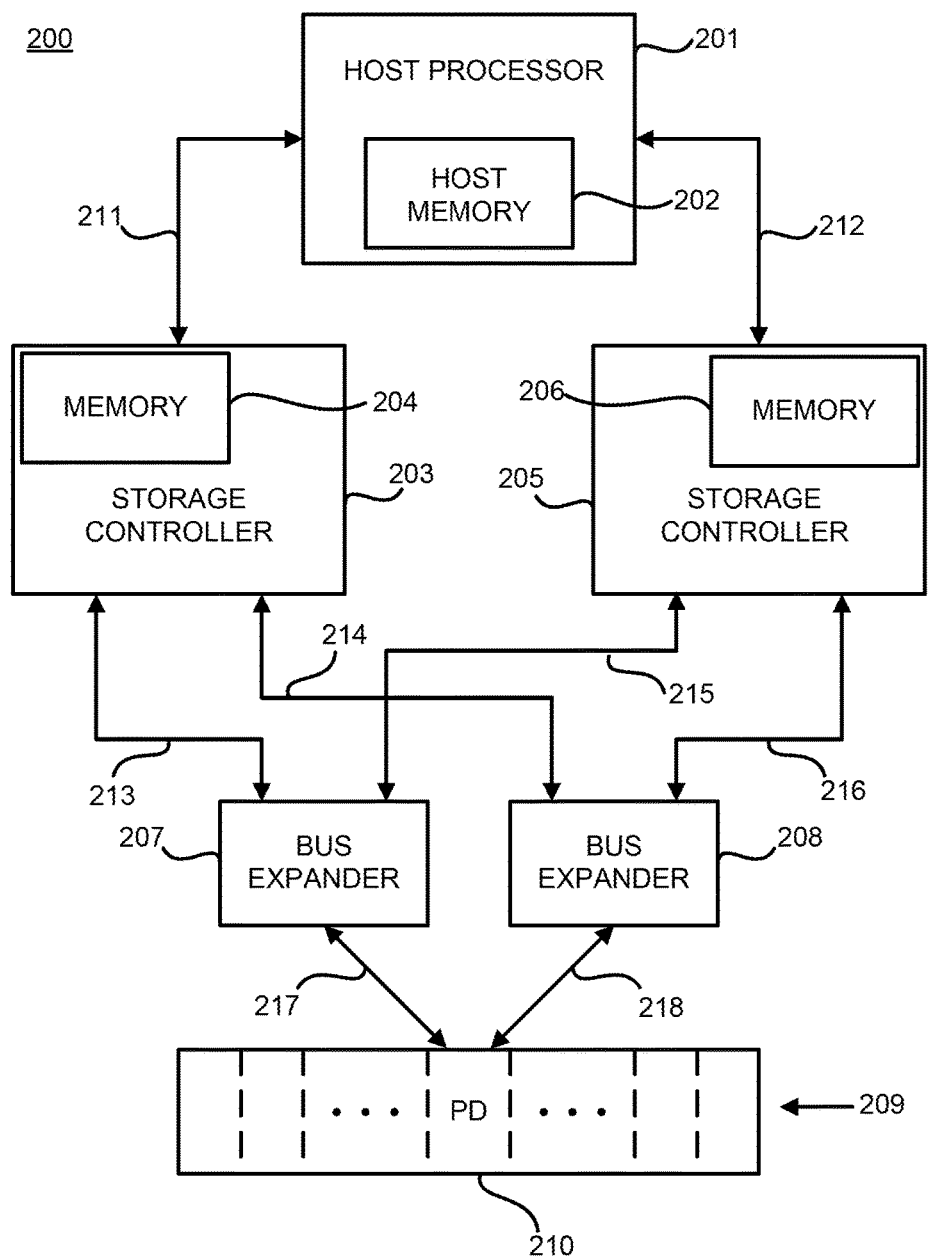
FIG. 2 is a block diagram illustrating a redundant storage controller system using non-redundant storage controllers according to an embodiment of the present disclosure.

FIG. 2 shows a redundant storage controller system 200 including host processor 201, storage controller 203, storage controller 205, bus expander 207, bus expander 208, and disk array 209. Host processor 201 comprises host memory 202. Storage controller 203 comprises memory 204. Storage controller 205 comprises memory 206. Disk array 209 comprises physical disk (PD) 210. Host processor 201 is coupled to storage controller 203 via connection 211 and to storage controller 205 via connection 212. Storage controller 203 is coupled to bus expander 207 via connection 213 and to bus expander 208 via connection 214. Storage controller 205 is coupled to bus expander 207 via connection 215 and to bus expander 208 via connection 216. Bus expander 207 is coupled to PD 210 via connection 217. Bus expander 208 is coupled to PD 210 via connection 218.

Host processor 201 can communicate commands, such as read commands and write commands, to storage controller 203 via connection 211 and to storage controller 205 via connection 212. One of storage controllers 203 and 205 can be selected to serve as a primary controller, and the other of storage controllers 203 and 205 can be selected to serve as a peer controller. The primary controller can provide control of a storage subsystem comprising bus expanders 207 and 208 and disk array 209. The peer controller can serve as a backup controller ready to serve as the primary controller, for example, upon failure of a current primary controller. While the system of FIG. 2 is illustrated as having two storage controllers 203 and 205, more than two storage controllers may be provided. For example, one of several storage controllers can be a primary controller, and others of the several storage controllers can be peer controllers. Multiple instances of the system of FIG. 2 may be provided, such that one storage controller of at least two storage controllers is a primary controller for one disk array, and one storage controller of at least two other storage controllers is a primary controller for another disk array. Disk array 209 can comprise several PDs, including PD 210 and other PDs. A redundant storage controller system can control the several PDs of disk array 209 to serve collectively as a virtual disk (VD) of a redundant storage system, such as a redundant array of independent disks (RAID) storage system.

In accordance with at least one embodiment, storage controller 203 stores state information locally in memory 204, and storage controller 205 stores state information locally in memory 206. The storage controller serving as the primary controller can use the state information stored locally for performing storage operations, such as a write operation, on the storage subsystem. The primary controller can store the state information in response to a storage command received from host processor 201. Host processor 201 can provide a copy of the storage command to the storage controller serving as the peer controller. The peer controller can store the state information in response to the copy of the storage command received from host processor 201. The peer controller can have in its memory a copy of the state information in the memory of the primary controller. If the primary controller fails, the peer controller can assume the role of the primary controller using the copy of the state information already stored in its memory.

In accordance with at least one embodiment, host processor 201 can provide a host memory region of host memory 202 to be used as a common memory region shared between storage controller 203 and storage controller 205. Both storage controller 203 and storage controller 205 can access the host memory region of host memory 202. As examples, both storage controller 203 and storage controller 205 can read from and write to the host memory region of host memory 202. As an example, direct memory access (DMA) can be used by storage controller 203 and storage controller 205 to access the host memory region of host memory 202. As an example, the host memory region of host memory 202 can be implemented as non-volatile memory (NVM), such as non-volatile random-access memory (NVRAM), which can preserve data, for example, write data to be written to a storage subsystem. One of storage controller 203 and storage controller 205 can serve as a primary controller. The primary controller can use information stored in the host memory region of host memory 202 to perform a storage operation, such as a write operation, on the storage subsystem, for example, to disk array 209. In the event of a failure of the primary controller, the other one of storage controller 203 and storage controller 205 serving as a peer controller can assume the role of the primary controller and can perform a storage operation using the information stored in the host memory region of host memory 202. The failed storage controller can be removed from service or assigned to serve as a peer controller in case its failure was of a temporary nature.

Figure 3:
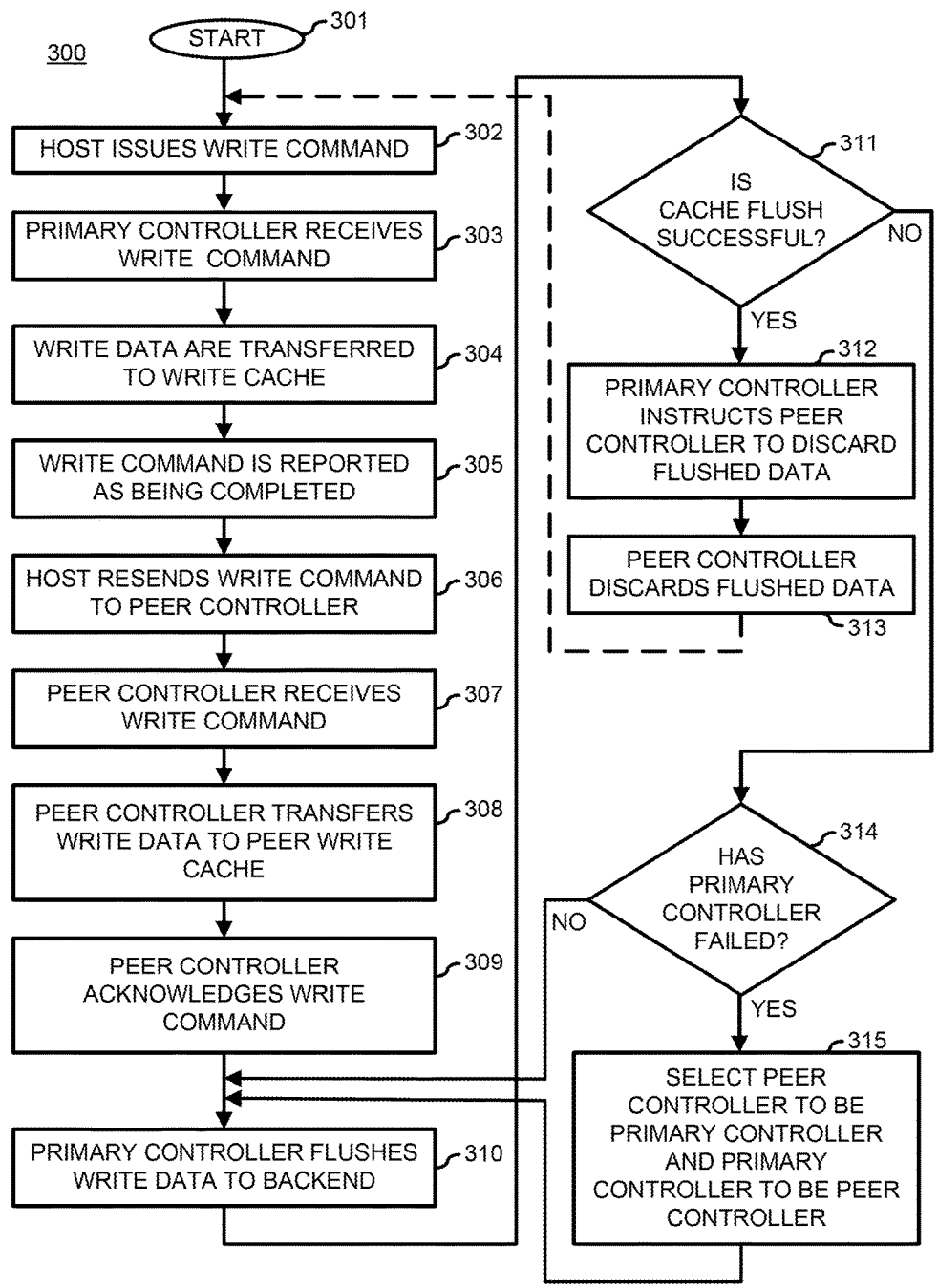
FIG. 3 is a flow diagram illustrating a method for providing a redundant storage controller system using non-redundant storage controllers according to an embodiment of the present disclosure.

FIG. 3 shows a method for providing a redundant storage controller system according to an embodiment of the present disclosure. Method 300 begins at block 301 and continues to block 302 where the host processor issues a write command to a storage controller that is serving as a primary controller. From block 302, method 300 continues to block 303. In block 303, the primary controller receives the write command from the host controller. From block 303, method 300 continues to block 304. In block 304, write data is transferred to the write cache. For example, the primary controller can store write data associated with the write command in a write cache in the primary controller's memory contained within the primary controller. From block 304, method 300 continues to block 305. In block 305, the write command is reported as having been completed. For example, the primary controller sends a report back to the host processor that the write command has been completed. From block 305, method 300 continues to block 306. In block 306, the host processor resends the write command to the peer controller. From block 306, method 300 continues to block 307. In block 307, the peer controller receives the write command from the host processor.

From block 307, method 300 continues to block 308. In block 308, the peer controller transfers write data associated with the write command to a peer write cache. For example, the peer controller can store the write data in a peer write cache in the peer controller's memory contained within the peer controller. From block 308, method 300 continues to block 309. In block 309, the peer controller acknowledges the write command. For example, the peer controller sends a report back to the host processor that the peer controller has received the write command. From block 309, method 300 continues to block 310. In block 310, the primary controller flushes the write data to the backend. For example, the primary controller can retrieve the write data from the primary controller's memory and can send the write data to be written to a storage subsystem, such as PD 210 of disk array 209 via bus expander 207 or bus expander 208. From block 310, method 300 continues to decision block 311. In decision block 311, a decision is made as to whether or not the cache flush of block 310 was successful. If the cache flush was successful (e.g., if the write data were successfully written to the storage subsystem), method 300 continues to block 312. In block 312, the primary controller instructs the peer controller to discard from its memory the write data successfully flushed from the write cache of the primary controller's memory. From block 312, method 300 continues to block 313. In block 313, method 300 continues to block 313. In block 313, the peer controller discards from its memory the write data that was successfully flushed from the write cache of the primary controller's memory. From block 313, method 300 can, for example, return to block 302, where another write command can be received.

If, at decision block 311, a decision is made that the cache flush of block 310 was not successful, method 300 can continue to decision block 314. In decision block 314, a decision is made as to whether or not the primary controller has failed. If not, method 300 returns to block 310, where the primary controller can again attempt to flush write data to the backend. If, in decision block 314, the decision is made that the primary controller has failed, method 300 continues to block 315. In block 315, the storage controller that was serving as the peer controller is selected to become the primary controller. As an example, the storage controller that was serving as the primary controller can be selected to become the peer controller. As another example, the storage controller that was serving as the primary controller can be removed from service. For example, host processor 201 can select among storage controller 203 and storage controller 205 to select one to serve as the primary controller and the other to serve as a peer controller.

While method 300 has been described with respect to two storage controllers, more than two storage controllers may be provided. For example, one of several storage controllers can be a primary controller, and others of the several storage controllers can be peer controllers. Multiple instances of method 300 may be performed, such that one storage controller of at least two storage controllers is a primary controller for one disk array, and one storage controller of at least two other storage controllers is a primary controller for another disk array. From block 315, method 300 continues to block 310, where the newly selected primary controller, using write data already stored in its memory at block 308, can attempt to flush the write data to the backend.

Figure 4:
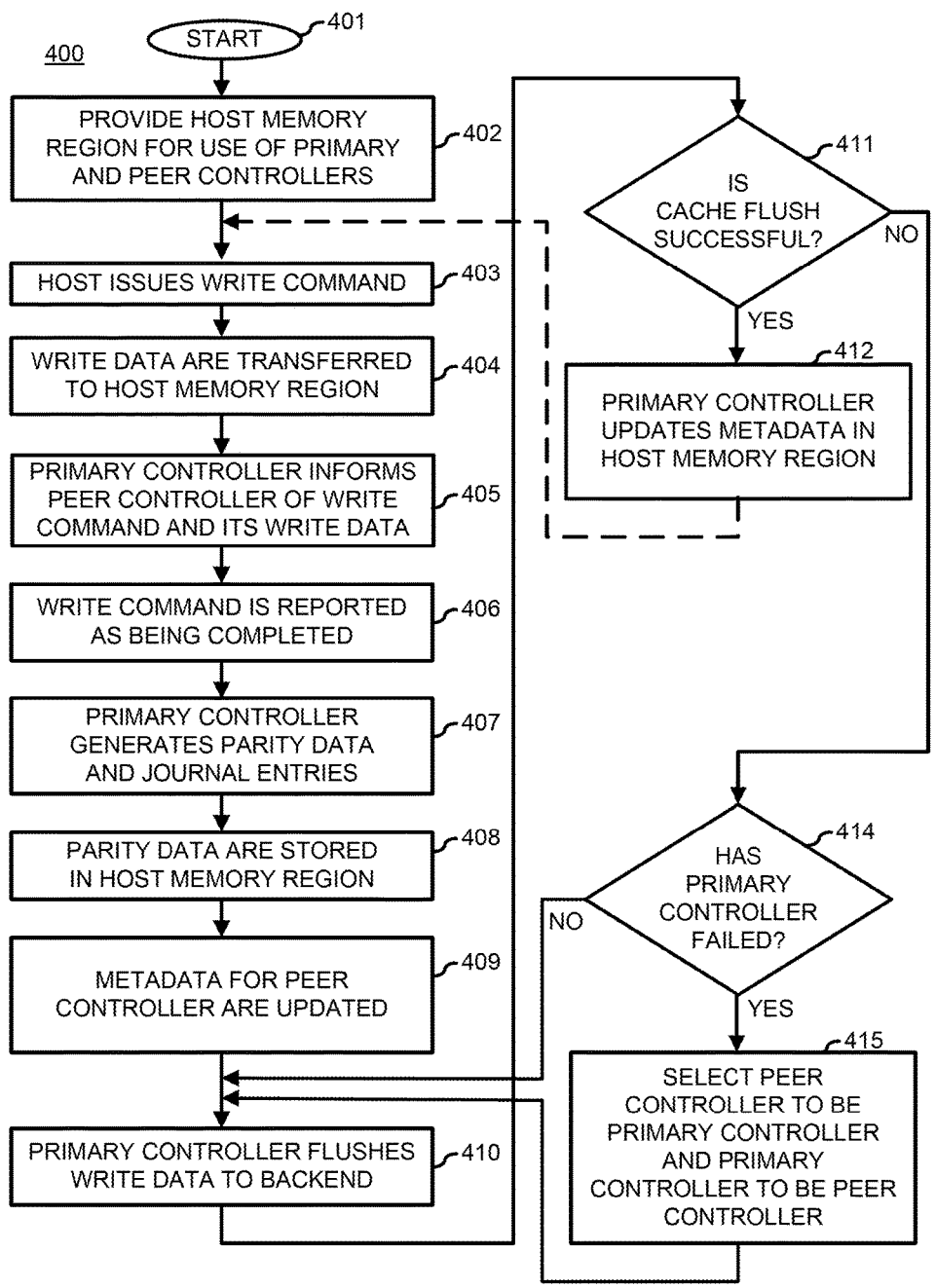
FIG. 4 is a flow diagram illustrating a method for providing a redundant storage controller system using non-redundant storage controllers according to an embodiment of the present disclosure.

FIG. 4 shows a method for providing a redundant storage controller system using non-redundant storage controllers according to an embodiment of the present disclosure. Method 400 begins in block 401 and continues to block 402 where host memory region of a host memory is provided as a common memory region to be accessible to and available for use of both a primary controller and one or more peer controllers. For example, shared access to the host memory region may be provided to the primary controller and the one or more peer controllers using DMA. As an example, a host processor, such as host processor 201, can establish access for storage controllers, such as storage controllers 203 and 205, to a host memory region of host memory, such as host memory 202, and inform the storage controllers of the availability of the host memory region. From block 402, method 400 continues to block 403. In block 403, the host processor issues a write command. As an example, the primary controller receives the write command from the host processor. From block 403, method 400 continues to block 404. In block 404, write data are transferred to the host memory region. As one example, the primary controller stores the write data in the host memory region. From block 404, method 400 continues to block 405. In block 405, the primary controller informs the peer controller of the write command and the write data associated with the write command.

From block 405, method 400 continues to block 406. In block 406, the write command is reported as having been completed. As an example, the primary controller reports to the host processor that the write command has been completed. From block 406, method 400 continues to block 407. In block 407, the primary controller generates parity data and journal entries. Generating the parity data and the journal entries can comprise reading data from the storage subsystem, such as from disk array 209. The generation of parity data and journal entries can occur in preparation for the primary controller to flush write data to the backend in block 410. From block 407, method 400 continues to block 408. In block 408, parity data are stored in the host memory region. As an example, the primary controller stores in the host memory region the parity data it generated.

From block 408, method 400 continues to block 409. In block 409, metadata for a peer controller are updated. As an example, metadata descriptive of the primary controller's use of the host memory region are updated and stored so that the peer controller will be able to utilize the data stored by the primary controller in the host memory region in the event of a failure of the primary controller. From block 409, method 400 continues to block 410. In block 410, the primary controller flushes the write data to the backend. For example, the primary controller can retrieve the write data from the host memory region and can send the write data to be written to a storage subsystem, such as PD 210 of disk array 209 via bus expander 207 or bus expander 208. From block 410, method 400 continues to decision block 411. In decision block 411, a decision is made as to whether or not the cache flush of block 410 was successful. If the cache flush was successful (e.g., if the write data were successfully written to the storage subsystem), method 400 continues to block 412. In block 412, the primary controller updates the metadata in the host memory region. As an example, the primary controller updates the metadata in the host memory region to relieve a peer controller of the obligation to write the write data that was successfully flushed in block 410 in the event the primary controller fails and to relieve itself of the obligation to write the write data that was successfully flushed in block 410 in the event the primary controller continues to operate properly. From block 412, method 400 can, for example, return to block 403, where the host processor can issue another write command.

If, at decision block 411, a decision is made that the cache flush of block 410 was not successful, method 400 can continue to decision block 414. In decision block 414, a decision is made as to whether or not the primary controller has failed. If not, method 400 returns to block 410, where the primary controller can again attempt to flush write data to the backend. To avoid the possibility of an infinite loop, continued inability of the primary controller to successfully flush the cache can be treated as a failure of the primary controller so that decision block 414 will cause the method to have a peer controller attempt to perform the cache flush, as described below. If, in decision block 414, the decision is made that the primary controller has failed, method 400 continues to block 415. In block 415, the storage controller that was serving as the peer controller is selected to become the primary controller. As an example, the storage controller that was serving as the primary controller can be selected to become the peer controller. As another example, the storage controller that was serving as the primary controller can be removed from service. For example, host processor 201 can select among storage controller 203 and storage controller 205 to select one to serve as the primary controller and the other to serve as a peer controller.

While method 400 has been described with respect to two storage controllers, more than two storage controllers may be provided. For example, one of several storage controllers can be a primary controller, and others of the several storage controllers can be peer controllers. Multiple instances of method 300 may be performed, such that one storage controller of at least two storage controllers is a primary controller for one disk array, and one storage controller of at least two other storage controllers is a primary controller for another disk array. From block 415, method 400 continues to block 410, where the newly selected primary controller, using data already stored in the host memory region, can attempt to flush the write data to the backend.

Fault-tolerant storage subsystems can be created using custom-designed storage controller hardware. However, such custom-designed storage controller hardware intended from its inception to provide fault tolerance tends to be expensive, inflexible, and may impair any ability to offer improved performance in the future. More useful is an ability to use commodity systems, operating systems (OSs), and software to more efficiently and rapidly replicate uncommitted data across multiple commodity storage controllers, enabling faster and less expensive fault-tolerant storage subsystems. A redundant storage controller system using non-redundant storage controllers can improve the efficiency of data replication while providing failure protection against controller failure. A redundant storage controller system using non-redundant storage controllers and shared memory commonly accessible to the storage controllers can be enhanced to replicate data within host memory regions to protect against non-volatile memory failure. In accordance with at least one embodiment, an efficient data replication mechanism can be provided between storage controllers using off-the-shelf hardware. In accordance with at least one embodiment, improved overall utilization of a peripheral interconnect, such as a Peripheral Component Interconnect Express (PCIe) interconnect, and storage interconnects can be provided. In accordance with at least one embodiment, a software-based mechanism applied to commercially available off-the-shelf storage controllers that do not otherwise provide fault tolerance can transform such storage controllers into a redundant storage controller system that provides fault tolerance and can replicate data, thereby replacing or eliminating a need for proprietary hardware solutions. In accordance with at least one embodiment, a fault tolerant system can be provided to be scalable for various types of devices, such as various types of PCIe devices.

As one example, two storage controllers can be configured to synchronize cache storage and operations using back-end bus expanders, such as back-end serial-attached small-computer serial interface (SAS) expanders, as a communication conduit. According to such an example, the throughput and latency of controller cache mirroring during write operations can be improved as discussed herein. The following three failure modes can be accommodated without data loss using an exemplary embodiment: controller failover at runtime, controller failover coincident with system reboot, and controller failover coincident with system failure.

When using commodity storage controllers to build a redundant fault tolerant storage solution, by definition no specialized hardware assist exists for data replication between controllers. A fault tolerant storage subsystem has a need to exchange user data and other information between multiple storage controllers to respond to failure scenarios. A performant redundant storage controller subsystem requires a fast and efficient mechanism to replicate data between controllers, both host-originating and controller-originating. This data exchange can occur for multiple reasons including load balancing, failover, unexpected controller failures, or controller power loss. Using storage interconnects for this data exchange, involving busses and the accompanying control mechanisms not designed for this purpose, can have the effect of reducing the effective throughput of input and output (I/O) to the storage devices and can create bus contention.

Extending the common commodity-based approach, a full system solution can be built upon commodity computing platform architectures, commodity operating systems, and accompanying software. Moreover, a solution can be achieved using no hardware modifications to the storage controllers.

In accordance with at least one embodiment, a double dispatch technique is provided. Such a technique can utilize software to transform storage controllers not otherwise configured to provide cache replication into storage controllers using cache replication to parallelize operation of the several storage controllers. A single write command coming from an operating system is replicated to all storage controllers, with acknowledgement of the write back into the operating system occurring only after all controllers have completed the operation. The primary controller signals the peer controllers when lazy back-end flush completes.

As an example according to the double dispatch technique, the device driver, or other layer, of the respective operating system forks a single write command into two commands. One write request is sent to the active controller while a duplicate of the command is sent to the passive controller. The software layer will be responsible for all necessary actions to translate the scatter-gather list (SGL) addresses into appropriate physical addresses for each controller. The software layer performing the double dispatch must wait until both write commands are acknowledged before returning the original (single) command back up the stack. If failover occurs, the controller becoming active must adhere to a "read peers" only policy (no read-modify-write (RMW)) to flush data to parity based volumes (RAID logical unit numbers (LUNs)) because it cannot be known whether a journal was open at the time of the failover. This approach can accommodate a shared write journal when a parity based VD is non-optimal, for example, by falling back to legacy behavior of maintaining cache mirroring using the SAS back-end.

When primary (such as active) controller flushes (such as writes) dirty data to disk it informs the peer (such as passive) controller(s) that the respective cache lines can be freed, so as to free memory to allow further write operations to succeed. This invalidation operation can be performed over the storage interconnect or the peripheral interconnect, for example with PCIe-to-PCIe transfer. The invalidation message size is small and fixed (as opposed to moving all user data across the storage interconnect). Furthermore, the invalidation may be posted (no acknowledgement) and latent with no harmful consequences because in the event of failure the newly-active controller shall write all dirty data in a read peers mode of operation. Note that re-writing the same data by both the formerly active and newly active controllers has no negative consequence (such as exhibiting an idempotent property).

The double dispatch approach parallelizes the copy of data from host memory to the controller's memory, taking advantage of separate PCIe hierarchies. Write command latency can be improved because, according to at least one embodiment, command completion involves data movement across the peripheral interconnect only. The storage interconnect need not be involved in the host write command process. Operating system components, for example, Microsoft Windows MPIO DSM layer or VMWare ESX NMP, can be used to provide interception points in the stack to implement a double dispatch technique.

In accordance with at least one embodiment, a technique of sharing host memory, such as sharing host dynamic random-access memory (DRAM), which may be, for example, non-volatile DRAM (NVDRAM), is provided. Such a technique can leverage emerging non-volatile RAM technologies to efficiently share data between multiple controllers, potentially reducing or removing the need for on-controller DRAM. In accordance with an example of such technique, storage controllers can use host DRAM as an extension of the internal cache within a controller where all controllers involved are aware of the shared region within the host DRAM. The primary controller makes writes into this region, and, in the event of a failover, the newly active controller handles the area as it would its own cache. This shared cache region contains host data, controller generated parity data, and metadata regarding the state of the individual cache lines. A robust implementation can be provided by configuring this shared memory to reside in non-volatile host memory in order to preserve cache contents in the event of an abrupt power loss.

Both the primary (such as active) and peer (such as passive) controllers have knowledge of a common region of host memory which is used to coordinate activities. Such a shared memory can be used to implement a fully-shared cache holding the host data yet-to-be-written. Both controllers can map this host memory into their local address space and manage it as an extension of the already existing cache lines. Upon receipt of a write command, the active controller copies the write data to both its local DRAM and the reserved host memory region. The primary (such as active) controller is configured to write into this region exclusive of the peer (such as passive) controllers. Upon failover, the newly established primary (such as newly active) controller resumes operations from the current state of the shared memory cache. As an example, the newly established primary controller can do so by first mirroring the contents into the newly established primary controller's local DRAM. From this point forward, the newly established primary controller serves as the primary (such as active) controller.

The location of the common shared memory region is communicated to both the primary controller and the peer controller(s). As an example, a device driver may be used as the mechanism by which to communicate such location. The system firmware (such as unified extensible firmware interface/basic input output system (UEFI/BIOS)) can optionally be configured to reserve a fixed-size pre-determined address range. Cache invalidation is provided in this shared memory cache extension, as the metadata reflects the state of the cache line. No explicit cache invalidation is necessary.

In accordance with at least one embodiment, a robust non-volatile DRAM region is provided in the host memory and configured to be accessible to both primary and peer controllers. The reliability of the storage subsystem is based on the unlikelihood of both a primary controller failure and host DRAM failure happening simultaneously. If the primary controller fails, but host DRAM does not, the passive controller can take control and complete the write operations. If the host DRAM fails, the primary controller is able to complete the writes based on the (mirrored) contents of its internal DRAM. If a peer controller fails, the primary controller can continue to operate normally.

While embodiments have been described herein with respect to storage technology, such as disk arrays, other embodiments may be applied to any system that shares an interconnect topology, such as a PCIe topology, across multiple devices. For example, if it is desirable to replicate data across multiple non-volatile memory controllers of a suitable interconnect topology, such as a PCIe topology, an embodiment using multiple non-volatile memory controllers may be implemented in accordance with the disclosure herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:

sending, by a host processor, a write command to a storage controller;

transferring, by the host processor, write data via a first connection to the storage controller, the write data associated with the write command;

transferring, by the host processor, an electronic copy of the write data via a second connection to a backup storage controller providing redundancy for the storage controller;

determining, by the host processor, a failure associated with the write command sent to the storage controller; and selecting, by the host processor, the backup storage controller to provide the redundancy in response to the failure associated with the write command.

2. The method of claim 1, further comprising sharing a memory between the storage controller and the redundant storage controller.

3. The method of claim 1, further comprising sending a read command to the storage controller.

4. The method of claim 1, further comprising copying the write command to the backup storage controller.

5. The method of claim 1, further comprising hosting a common memory region between the storage controller and the redundant storage controller.

6. The method of claim 1, further comprising sending the write command to the redundant storage controller.

7. The method of claim 1, further comprising resending the write command to the redundant storage controller.

8. The method of claim 1, further comprising determining the failure of the storage controller.

9. A system, comprising:

a hardware processor; and a memory device storing instructions that when executed cause the hardware processor to perform operations, the operations including:

sending a write command to a storage controller;

transferring write data via a first connection to the storage controller, the write data associated with the write command;

transferring an electronic copy of the write data via a second connection to a backup storage controller providing redundancy for the storage controller;

determining a failure associated with the write command sent to the storage controller; and selecting the backup storage controller to provide the redundancy in response to the failure associated with the write command.

10. The system of claim 9, where the operations further comprise sharing a memory between the storage controller and the redundant storage controller.

11. The system of claim 9, where the operations further comprise sending a read command to the storage controller.

12. The system of claim 9, where the operations further comprise copying the write command to the backup storage controller.

13. The system of claim 9, where the operations further comprise hosting a common memory region between the storage controller and the redundant storage controller.

14. The system of claim 9, where the operations further comprise sending the write command to the redundant storage controller.

15. The system of claim 9, where the operations further comprise resending the write command to the redundant storage controller.

16. The system of claim 9, where the operations further comprise determining the failure of the storage controller.

17. A memory device storing instructions that when executed cause a hardware processor to perform operations, the operations comprising:

sending a write command to a storage controller;

transferring write data via a first connection to the storage controller, the write data associated with the write command;

transferring an electronic copy of the write data via a second connection to a backup storage controller providing redundancy for the storage controller;

determining a failure associated with the write command sent to the storage controller; and selecting the backup storage controller to provide the redundancy in response to the failure associated with the write command.

18. The memory device of claim 17, where the operations further comprise sharing a memory between the storage controller and the redundant storage controller.

19. The memory device of claim 17, where the operations further comprise sending a read command to the storage controller.

20. The memory device of claim 17, where the operations further comprise copying the write command to the backup storage controller.

* * * * *